Dec. 3, 1963 R. L. WILLIAMS 3,112,937
HOSE FITTING HAVING CONNECTING MEANS FOR AN INTERNAL
REINFORCING MEMBER AND METHOD OF ASSEMBLY
Filed Dec. 19, 1960
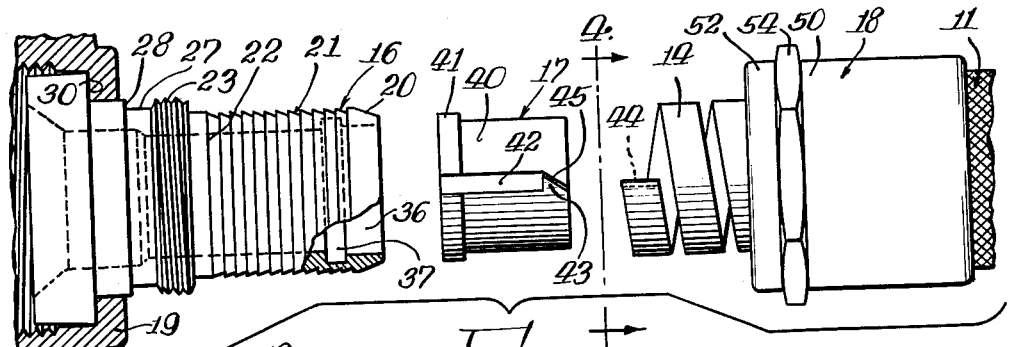
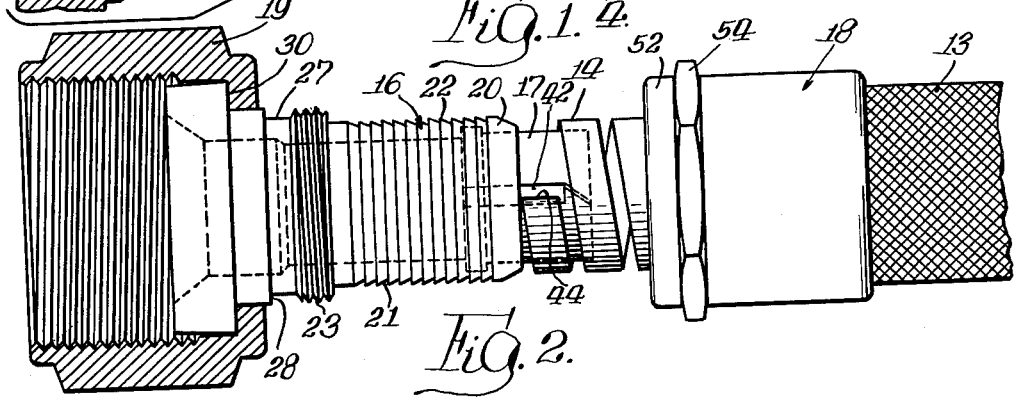
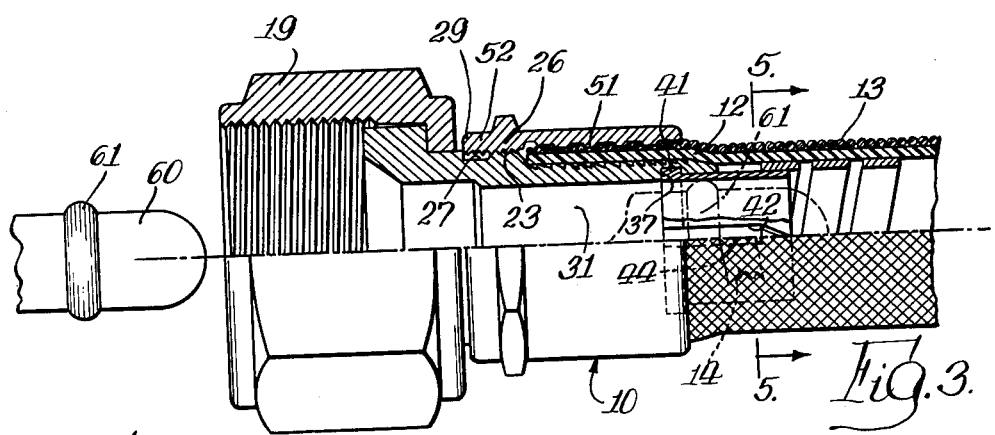
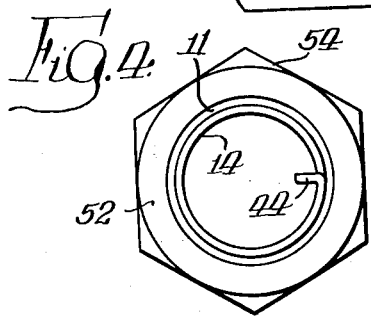
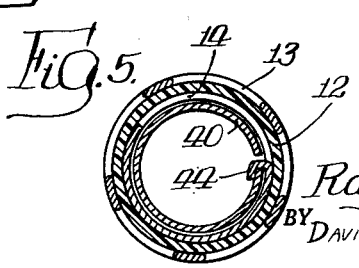
INVENTOR.
Ray L. Williams,
BY Davis, Lindsey, Hibben + Noyes
Atty's.

United States Patent Office 3,112,937
Patented Dec. 3, 1963

3,112,937
HOSE FITTING HAVING CONNECTING MEANS FOR AN INTERNAL REINFORCING MEMBER AND METHOD OF ASSEMBLY
Ray L. Williams, Fort Worth, Tex., assignor to Stratoflex, Inc., Fort Worth, Tex., a corporation of Texas
Filed Dec. 19, 1960, Ser. No. 76,856
7 Claims. (Cl. 285—114)

The present invention relates generally to a hose fitting and more particularly to an improved hose fitting and method of assembling said fitting on the end of a hose wherein said hose has an internal reinforcing means disposed within said hose.

In flexible hose of the type having an elastomer inner tube for retaining fluid and an outer flexible wire braid reinforcing structure which is subjected to relatively high or low pressures, it is often desirable to provide an internal reinforcing member, such as a coil spring, within the elastomer inner tube. The coil spring greatly increases the resistance of the hose to relatively high external pressures and internal vacuums, thereby preventing collapse of the hose under such operating conditions, as well as preventing collapse of the hose when the latter is bent.

Unless the internal coil spring within the hose has the end thereof secured to the hose fitting, however, the coil spring may be moved longitudinally within the inner tube under various operating conditions. When the coil spring moves away from the hose fitting, the hose may collapse adjacent the said fitting. Also, the coil spring could move longitudinally so as to interfere with the proper operation of a valve means or other apparatus associated with the said hose.

When assembling a hose fitting of the foregoing type on the end of a hose section, a nipple member is generally threadably or otherwise secured in telescoping relationship with a socket member associated with the hose, by relative rotative movement. The latter operation creates an objectionable condition, particularly with a reusable hose fitting which has several threads formed on the respective interengaging threaded sections. If an internal coil spring has one end fixedly secured to the nipple member, for example, the coil spring is subjected to increased stress and tension as a result of rotating the nipple with respect to the said socket member and hose.

It is therefore an object of the present invention to provide an improved end fitting for a hose having an internal reinforcing member.

It is a further object of the present invention to provide a novel end fitting for a flexible hose having improved means for securing an internal reinforcing coil spring to said fitting.

Other objects and advantages of the present invention will be apparent from the following detailed description and claims when read in conjunction with the accompanying drawing wherein:

FIGURE 1 is an exploded side elevational view partially in section of a hose fitting embodying the present invention;

FIGURE 2 is a side elevational view of the hose fitting of FIGURE 1 in one stage of assembly on a flexible hose;

FIGURE 3 is a side elevational view of the hose fitting of FIGURE 1 partially in section showing the final assembly thereof on a hose;

FIGURE 4 is an end view of the hose taken along line 4—4 of FIGURE 1; and

FIGURE 5 is a sectional view taken along line 5—5 of FIGURE 3.

The hose fitting 10 of the present invention is adapted to be mounted on the end of a hose 11 which comprises an inner tube 12 of elastomeric material, such as polytetrafluoroethylene, with an externally reinforcing covering 13, such as wire braid. Within the inner tube 12 and extending the length thereof is an internal reinforcing member comprising a coil spring 14 preferably made of flat spring steel wound in the form of a continuous helix.

The hose fitting 10 comprises generally a nipple member 16, an insert member 17, and a socket member 18. The nipple member 16 may be provided with a coupling means, such as a nut 19. The nipple member 16 as illustrated has a generally tubular form and is preferably provided with an end section 20 of sufficiently small diameter to be inserted in the end of the inner tube 12 of the hose. The nipple member 16 has a cylindrical section 21 of substantially the same length as the socket member 18 and is preferably provided on its external surface with annular ribs or threads 22 for engaging the inner tube 12 and gripping the hose between the section 21 and the socket member 18. The nipple member 16 may also be provided with an externally threaded section 23 for engagement with an internally threaded section 26 formed on the socket member 18. A relief groove 27 is preferably formed at one end of the threaded section 23 to insure full threading engagement of the threaded parts. A shoulder 28 may also be provided at one side of the groove for abutment with the end 29 of the socket member 18. An enlarged end flange is preferably formed at the outer end of the nipple member 16 to provide a shoulder 30 for retaining a coupling nut 19 which is adapted to be drawn tightly against the shoulder 30 when the nut 19 is coupled to a coacting part (not shown).

On the inner surface 36 of the cylindrical section 21 of the nipple member 16 and preferably spaced only a short distance from the end thereof is a retaining means in the form of a circumferential groove 37. The groove 37 is adapted to retain rotatably therein the outer end of the insert member 17. In the preferred embodiment, the insert member 17 is preferably resilient and of a spring steel tubular construction providing a cylindrical section 40 and having a split 45 extending the length thereof. The cylindrical section 40 has an external diameter normally slightly larger than the internal diameter of the cylindrical section 21 of the nipple member 16. Formed preferably at one end of the cylindrical section 40 is a radially resilient retaining means in the form of an enlarged diameter flange 41 which is adapted to seat and resiliently engage in the groove 37. Thus, the insert member 17 is retained in the nipple member 16 and is free to rotate about its longitudinal axis.

The cylindrical section 40, when retained by the nipple member 16 in the foregoing manner, projects axially beyond the end of the nipple member 16. The split 45 in the insert member 17 is widened for part of its length beyond the end of the nipple member 16 to provide a slot 42 extending axially through the flange 41 and to a point spaced from the opposite end of the cylindrical section 40 and provides a radial opening extending through the lateral wall of the cylindrical section 40 beyond the end of the nipple member 16 to accommodate an end or tang 44 of the coil spring 14 which preferably extends radially inwardly until deformed. A circumferential tab 43 is preferably formed by having the end of the split 45 extending angularly with respect to the longitudinal axis of section 40 from a corner of the slot 42 to the end of the section 40 spaced from flange 41 which substantially closes the end of the slot 42 and prevents the tang 44 from moving axially out of the slot.

The socket member 18 is preferably in the form of a cylindrical sleeve section 50 having an internal annular ribbed or threaded section 51 for engagement with the reinforcing covering 13 of the hose 11. At the outer end of the sleeve section 50 is a flange section 52 which is provided with threads constituting the internal threaded section 26 for engagement with the threaded section 23 of the nipple member 16. A circumferential wrench receiving section 54 is provided on the outer surface of the socket member 18 at a point spaced from the outer end of the socket member 18.

In the assembly of the fitting 10 on the hose 11, the hose is fixedly positioned with the socket member 18 mounted over the end of hose 11 and having the annular ribbed section 51 thereof engaging the reinforcing braid 13. The internal reinforcing coil spring 14 is adjusted so that a portion thereof extends a short distance outwardly beyond the end of the socket member 18. An end portion of the coil spring 14 is bent radially inward to provide the tang 44 which is adapted to form a locking engagement with the insert member 17, as will be described hereinafter.

The nipple member 16 and the insert member 17 are next assembled by pressing the lateral surfaces of the resilient split cylindrical section 40 until the end flange 41 thereof can be inserted into the open end of the nipple member 16 and the insert member is then moved inwardly until the flange 41 engages in the groove 37 of the nipple member 16. When the pressure on the insert member 17 is released, the flange 41 snaps into the groove 37 and securely holds the insert member 17 in the nipple member 16 with the end thereof projecting from the nipple member 16 and exposing a substantial portion of the slot 42 therein. The insert member 17 is freely rotatable about its longitudinal axis while held in the nipple member 16.

The coil spring 14 is next attached to the nipple-insert assembly by placing the tang 44 in the slot 42, as shown in FIG. 2 of the drawing, with the insert member 17 projecting axially within the coil spring 14 and then bending the tang 44 against the inner surface of the insert member. The cylindrical section 21 of the nipple member 16 and the insert member 17 with the coil spring 14 secured thereto is then placed in the end of the hose, and the nipple member is secured to the socket member 18 by rotating the nipple to threadably engage the threaded section 26 of the socket member 18 until the end of the socket member 18 abuts the shoulder 28.

The socket member 18 of the fitting 10 is thereafter swaged or crimped on the hose 11, and the nipple member 16 is expanded by inserting a mandrel 60, having an enlarged ring section 61 formed intermediate the ends thereof, axially through the nipple member 16 and insert member 17, as shown in FIG. 3 of the drawing. The ring section 61 expands the nipple to clamp the hose between the socket and nipple members, and also forces the tang 44 into tight engagement with the inner surface of the insert member 17, if the tang 44 has not previously been so deformed.

It will be apparent that the fitting 10 fastened to the end of the hose 11 in the above described manner securely attaches the reinforcing coil spring to the fitting so that the coil spring cannot move longitudinally within the hose away from the fitting. At the same time it permits the nipple member 16 to be rotated relative to the insert member 17 and spring 14 during the threading engagement of the nipple with the socket member 18 without causing the coil spring 14 to be simultaneously rotated and placed under tension.

I claim:

1. A hose fitting for a hose having a reinforcing member movably disposed therein, which comprises; a socket member adapted to be mounted over one end of the hose, a nipple member secured to said socket in telescoping relationship therewith and adapted to extend into the hose, an insert member rotatably mounted in said nipple but held against longitudinal movement relative thereto, said insert having a section thereof extending axially beyond the end of said nipple and adapted to extend into the end of said hose, said reinforcing member being adapted to be secured to said insert member, whereby said reinforcing member is restrained against axial movement with respect to said fitting while permitting rotatable movement of said nipple member without effecting rotative movement of said reinforcing member.

2. A hose fitting as in claim 1 wherein said section of said insert has a slot therein which is substantially closed at the end thereof spaced from said nipple member and which is adapted to receive therein an end of said reinforcing member for restraining said end of the reinforcing member against axial movement away from said insert member.

3. A hose fitting for a flexible hose having a helical reinforcing member movably disposed within the interior thereof, which comprises; a socket member adapted to be fixedly mounted on an end of said hose, a nipple member having coupling means associated therewith, said nipple member being secured in telescoping relationship with said socket member by effecting relative rotatable movement therebetween, said nipple member having an insert member retaining means on the interior surface thereof, said insert member having resilient retaining means thereon engaging said retaining means of said nipple to retain said insert member rotatably in said nipple member, said insert member having a section thereof extending axially beyond the end of said nipple member, said section having a radial opening therein which is adapted to receive an end section of said reinforcing member and restrain said end section against axial movement relative to said insert member; whereby one end of said reinforcing member is restrained against axial movement with respect to said fitting while permitting rotatable movement of said nipple member without effecting rotative movement of said reinforcing member.

4. A hose fitting for a flexible hose having a helical reinforcing member movably disposed within the interior, which comprises; a socket member adapted to be fixedly mounted on the end of said hose, a nipple member threadably secured to said socket member and having a portion of said nipple in telescoping relationship with said socket, said nipple having a retaining groove provided in the interior surface of said nipple adjacent the end thereof extending into said socket, an insert member which is resilient and which has an enlarged split circumferential flange section in seated engagement with said retaining groove rotatably holding said insert in said nipple member with said insert extending axially beyond the end of said nipple member and adapted to extend into the interior of said hose, said insert member having a radial opening therein which is adapted to receive a radial inwardly extending end section of said reinforcing member and restrain said end section against axial movement relative to said insert member; whereby one end of said reinforcing member is restrained against axial movement with respect to said fitting while permitting rotatable movement of said nipple member without effecting rotative movement of said reinforcing member.

5. A hose fitting as in claim 4 wherein said insert member comprises a resilient longitudinally split tubular section having said flange at one end thereof with said radial opening being in the form of an enlarged slot extending axially from said flange along one side of said tubular section and terminating at a point spaced from the other end of said tubular section and being substantially closed by a generally transversely extending tab section which is adapted to prevent said end section of said reinforcing section from moving axially out of said slot.

6. A method of assembling an end fitting and a flexible hose having an inner tube of elastomeric material and a coil spring reinforcing means on the inner side of said tube, which comprises; placing a socket member about one end of a flexible hose, drawing one end of said reinforcing means outwardly beyond said tube, disposing adjacent said end of said reinforcing means a nipple member rotatably supporting an insert member in said end thereof, securing said end of said reinforcing means to said insert member, mounting said nipple member fixedly in telescopic relationship with said socket member by rotatively moving said nipple member relative to said socket member; whereby one end of said reinforcing means is restrained against axial movement with respect to said fitting while permitting rotatable movement of said nipple member without effecting rotative movement of said reinforcing means, and expanding said nipple member.

7. A method as in claim 6, wherein said end of said reinforcing means is inserted inwardly in an opening in said insert member to secure it thereto, and thereafter deforming said end of said reinforcing means against the inner surface of said insert member.

References Cited in the file of this patent

UNITED STATES PATENTS

| | | |
|---|---|---|
| 739,097 | Marcy | Sept. 15, 1903 |
| 2,228,018 | Scholtes | Jan. 7, 1941 |
| 2,441,344 | Bosworth | May 11, 1948 |
| 2,865,094 | Press | Dec. 23, 1958 |

FOREIGN PATENTS

| | | |
|---|---|---|
| 144,375 | Switzerland | Mar. 2, 1941 |